July 21, 1931.  F. E. DAVIS  1,815,431
SIX-WHEEL CHASSIS FOR MOTOR VEHICLES
Filed Dec. 10, 1929  2 Sheets-Sheet 1

INVENTOR
Floyd E. Davis,
BY his ATTORNEYS

July 21, 1931.  F. E. DAVIS  1,815,431
SIX-WHEEL CHASSIS FOR MOTOR VEHICLES
Filed Dec. 10, 1929   2 Sheets-Sheet 2
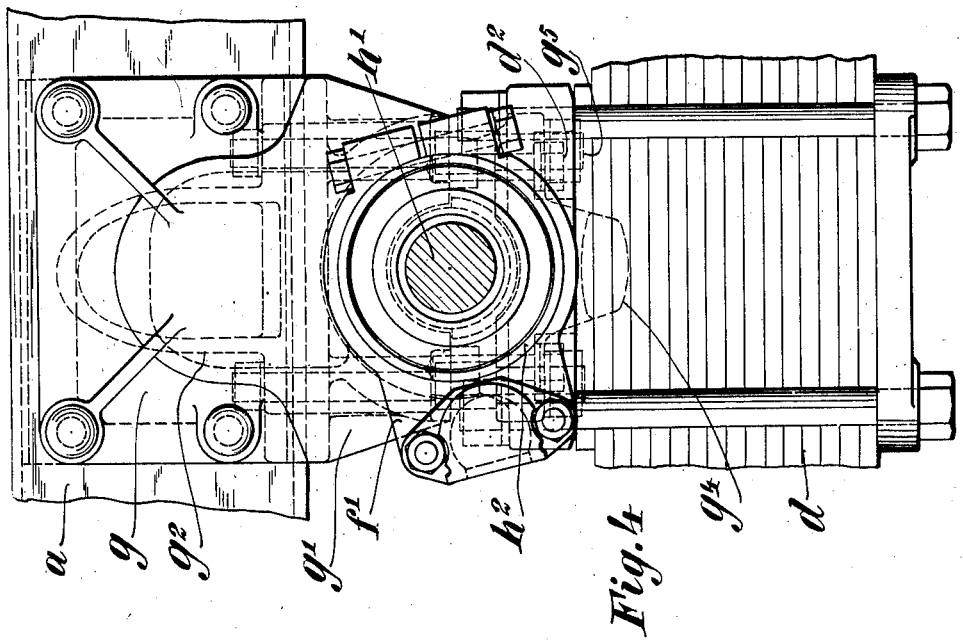
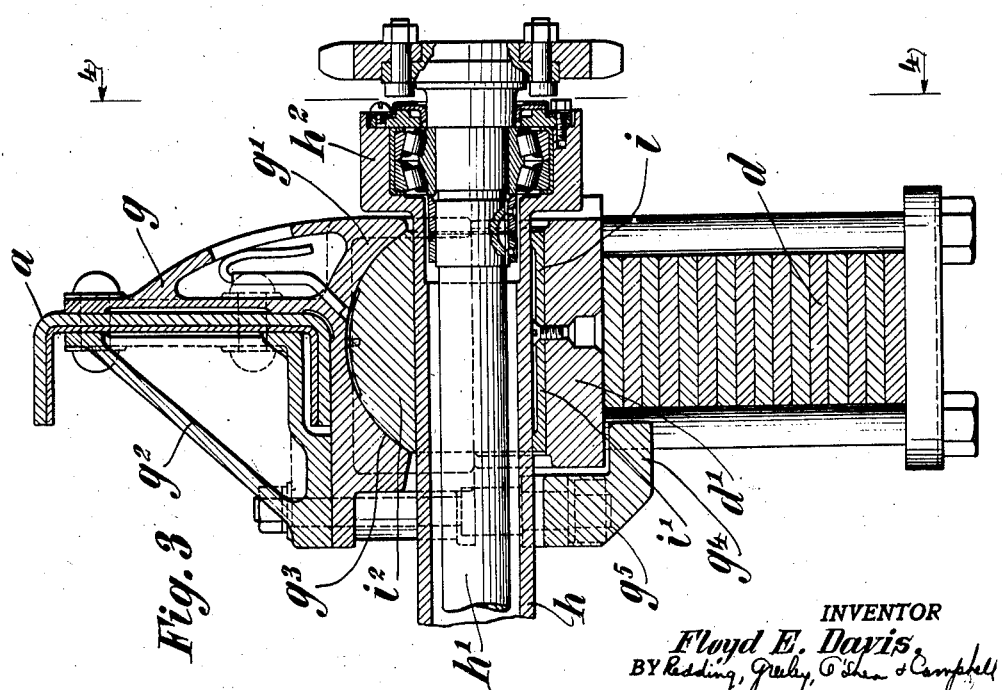
INVENTOR
Floyd E. Davis,
BY Redding, Greeley, O'Shea & Campbell
his ATTORNEYS Patented July 21, 1931

1,815,431

UNITED STATES PATENT OFFICE

FLOYD E. DAVIS, OF ALLENTOWN, PENNSYLVANIA, ASSIGNOR TO INTERNATIONAL MOTOR COMPANY, OF NEW YORK, N. Y., A CORPORATION OF DELAWARE

SIX WHEEL CHASSIS FOR MOTOR VEHICLES

Application filed December 10, 1929. Serial No. 412,955.

The present invention relates to spring suspensions for motor vehicles and embodies, more specifically, an improved spring suspension for motor vehicles of the type having two rear driving axles mounted as a unit upon the vehicle frame. Where a plurality of driving axles are utilized for a motor vehicle frame, considerable difficulty results in disposing the unsprung elements in such manner that complete flexibility is provided during all conditions under which the vehicle operates. Particularly is this true in the types of drives, wherein radius rods are utilized for transmitting the drive to the frame, the spring merely serving as a floating member for carrying the weight of the vehicle upon the axles.

With a view to affording a uniformly and completely flexible spring suspension which is capable of transmitting the most severe driving stresses, as well as carrying a maximum load upon the axle, the present invention has been devised and one of the chief features thereof is the provision of the swinging center of the main load carrying spring at the rear jack shaft housing center, rather than providing a separate center in the shape of a load carrying member, as done in existing structures.

An object of the invention, accordingly, is to provide a spring suspension which is uniformly flexible and in which the elements are maintained in proper relationship regardless of the conditions under which the vehicle operates.

A further object of the invention is to provide a spring suspension in which the unsprung elements are mounted about a single axis.

A further object of the invention is to provide a mounting of the above character in which the elements thereof are simple of construction and easily manufactured and assembled.

In the attainment of the above objects, a preferred type of mounting is utilized, the details of which will be understood more fully in connection with the accompanying drawings, wherein:

Figure 3 is a view in section, taken on line 3—3 of Figure 1, and looking in the direction of the arrows.

Figure 4 is a view in section, taken on line 4—4 of Figure 3, and looking in the direction of the arrows.

Figure 1:
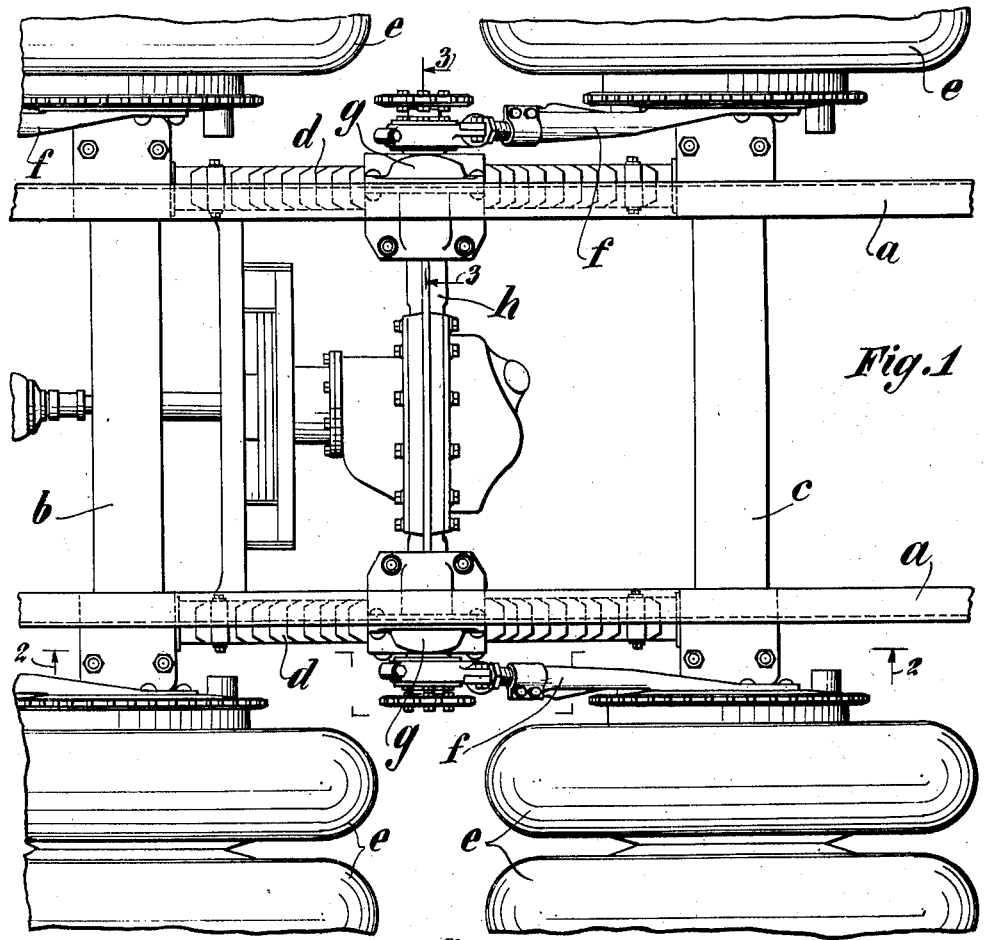
Figure 1 is a plan view of a portion of a vehicle chassis constructed in accordance with the present invention.
Figure 2:
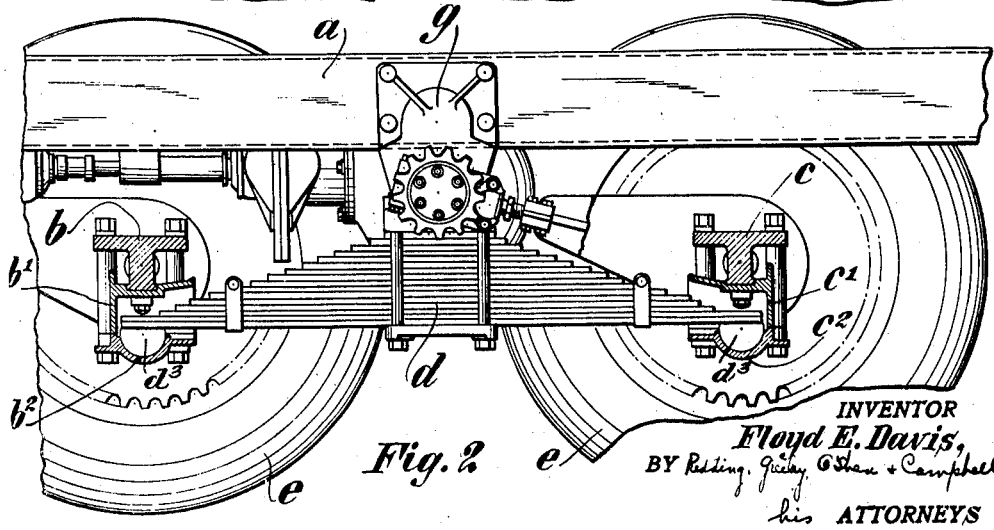
Figure 2 is a view in section, taken on line 2—2 of Figure 1, and looking in the direction of the arrows.

Referring to the above drawings, $a$ designates the side frame members of a vehicle chassis having a forward driving axle $b$ and a rearward driving axle $c$. These axles are tied together by means of springs $d$ and mount wheels $e$ in the usual manner. Distance rods $f$ transmit the drive from the rearward axle to the frame and the forward ends of these rods are connected to the frame in a manner to be described more fully hereinafter. The axles $b$ and $c$ carry housings $b'$ and $c'$ in which spherical bearing seats $b^2$ and $c^2$ are formed. The ends of the springs $d$ are formed with spherical bearing members $d^3$ and are seated in the spherical bearing seats $b^2$ and $c^2$ to afford the desired connection between the ends of the springs and the axles.

The forward axle transmits its drive to the frame through suitable radius rods in the usual manner. The rearward axle, however, being subjected to severe lateral and other stresses incident to its pivotal movement with respect to the forward axle, should be mounted in such manner that movement thereof may take place in response to such stresses without imposing deleterious strains upon the elements of the drive. The manner in which such strains are accommodated, in the present invention, is by mounting the forward ends of the rearward radius rods $f$ upon the jack shaft housings to cause pivotal movement of the rear axle to take place about the center of such housings.

To accomplish this purpose, and effectively mount the springs upon such housings, a bracket $g$ is mounted upon either side of the frame member $a$. This bracket is formed of two parts, $g'$ and $g^2$, the side frame members being received between such housing portions so that the load supporting portions thereof are disposed substantially under the frame members. From an inspection of Figure 3, it will be seen that the housing portion $g'$ is formed with a female spherical bearing seat $g^3$. Jack shaft housings $h$, carrying the usual jack shafts $h'$, are received within bushings $i$, secured to the spring seats $d'$, by means of bolts $d^2$. These bushings are formed with male spherical bearing surfaces $i^2$ to seat within the female bearing surfaces $g^3$ and prevent displacement of the spring seats $d'$ in a horizontal plane. The bushings $i'$ and $i^2$, of course, are split in order that they may be assembled over the jack shaft housings. Limiting fingers $g^4$ are secured under the jack shaft housings and to the brackets $g$ by means of bolts $g^5$ to prevent the spring seats $d'$ from being dislodged by movement in a vertical direction. These fingers $g^4$ project under the spring seats, as clearly shown in Figure 3.

At the extremities of the jack shaft housings, enlarged portions $h^2$ are formed to provide cylindrical bearing surfaces adjacent the brackets $g$. The forward ends of the rearward radius rods are provided with bearing members $f'$, these members being secured to the radius rods in the usual fashion. The bearing members $f'$ are secured rigidly in position on the cylindrical bearing members $h^2$, above described.

From the foregoing description, it will be apparent that the path of movement of the rearward driving axle is concentric to the axis of the jack shaft housings, such movement coinciding with that of the spring ends adjacent such axle. In this manner, the severe stresses incident to operation are relieved and complete flexibility of the driving elements is provided.

It will be further observed that the mounting described above results in reducing the overall width of the vehicle since, by the bracket construction, the spring and associated elements are mounted under the frame members. Such construction is made possible by reason of the mounting of the main load carrying springs upon the brackets in the manner described, and the further mounting of the distance rods in the manner described. By mounting the main load carrying spring in such manner that the swinging center thereof is about the rear jack shaft housing center, not only is a separate bearing therefor eliminated but the compact structure resulting permits the decrease in the overall width of the frame above described.

While the invention has been described with specific reference to the accompanying drawings, it is not to be limited, save as defined in the appended claims.

I claim as my invention:

1. In a vehicle having a wheel and a spring mounting the wheel upon the vehicle frame, means for mounting the wheel to an extremity of the spring, a bracket carried by the frame, a spherical bearing surface on the under portion of the bracket, a cooperating bearing member on the spring, a jack shaft housing, means to journal the housing in the last named bearing member, an enlarged bearing surface on the housing, a radius rod for the wheel, and means to secure the radius rod on the last named bearing surface.

2. In a vehicle having a wheel and a spring mounting the wheel upon the vehicle frame, means for mounting the wheel to an extremity of the spring, a bracket carried by the frame, a spherical bearing surface on the under portion of the bracket, a cooperating bearing member on the spring, a jack shaft housing, means to journal the housing in the last named bearing member, a bearing surface on the housing, a radius rod for the wheel, and means to secure the radius rod on the last named bearing surface.

3. In a vehicle having a wheel and a spring mounting the wheel upon the vehicle frame, means for mounting the wheel to an extremity of the spring, a bracket carried by the frame, a spherical bearing surface on the under portion of the bracket, a cooperating bearing member on the spring, a jack shaft housing, and means to journal the housing in the last named bearing member.

This specification signed this 23 day of November A. D. 1929.

FLOYD E. DAVIS.